United States Patent [19]

Chia et al.

[11] 3,864,374

[45] Feb. 4, 1975

[54] MANUFACTURE OF ALKALI METAL XANTHATES

[75] Inventors: Chu-jen Chia, Brossard, Quebec; Jack Ellwood Currah, PoinTe-Claire, Quebec; George Russell Lusby, Mont-Saint-Hilaire, Quebec, all of Canada

[73] Assignee: Canadian Industries, Limited, Quebec, Canada

[22] Filed: Nov. 19, 1973

[21] Appl. No.: 416,753

[52] U.S. Cl. ............................................. 260/455 B
[51] Int. Cl. ............................................. C07c 154/02
[58] Field of Search ............................... 260/455 B

[56] References Cited
UNITED STATES PATENTS

| | | | |
|---|---|---|---|
| 1,591,723 | 7/1926 | Missbach | 260/455 B |
| 2,011,302 | 8/1935 | Rosenstein | 260/455 B |
| 2,024,923 | 12/1935 | Hirschkind et al. | 260/455 B |
| 2,024,924 | 12/1935 | Hirschkind et al. | 260/455 B |
| 2,037,717 | 4/1936 | Graves | 260/455 B |
| 2,037,718 | 4/1936 | Graves | 260/455 B |
| 2,173,383 | 9/1939 | Carter | 260/455 B |
| 2,250,545 | 7/1941 | Mikeska et al. | 260/455 B |

*Primary Examiner*—Elbert L. Roberts
*Assistant Examiner*—D. R. Phillips
*Attorney, Agent, or Firm*—Alexander O. McIntosh

[57] ABSTRACT

Alkali metal xanthates are prepared by reacting a solid alkali metal hydroxide with carbon disulphide and an aliphatic alcohol, the reaction temperature being sufficiently high to maintain the latter two reagents in the vapour phase. The by-product water, being in the vapour phase, is removed from the reaction with the unreacted carbon disulphide and alcohol. The invention provides a means for preparing water-free alkali metal xanthates.

7 Claims, No Drawings

MANUFACTURE OF ALKALI METAL XANTHATES

This invention relates to a process for the manufacture of alkali metal xanthates employing reactions in the vapour phase.

Alkali metal xanthates are used widely in the mining industry as collectors in mineral ore flotation. In addition, there are minor uses of these xanthates as agents for the vulcanization of rubber, and as herbicides, insecticides and fungicides. The known process commonly employed for the manufacture of alkali metal xanthates is based on the reaction in liquid medium between an alkali metal hydroxide, an alcohol and carbon disulphide. The reaction for the manufacture of sodium xanthate is represented by the following equation:

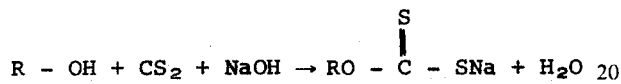

where R—OH is a monohydric alcohol. It has been found that water favours side reactions causing lower yields. Some processes have minimized the amount of water employed by avoiding the use of aqueous solutions of the alkali metal hydroxide, employing instead powdered solid. However, water is one of the products of the reaction.

An alternative process forms first the alkali metal alcoholate by the reaction,

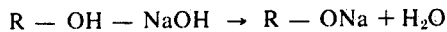

and separates the water from the alcoholate. The anhydrous alcoholate is then reacted with carbon disulphide to form an anhydrous xanthate,

This latter process requires a method for removing the water from the alcoholate. Azeotropic distillation has been employed for this purpose but this adds an additional step to the process. The use of sodium metal in place of sodium hydroxide to form the alcoholate avoids water formation but requires the use of a more expensive ingredient.

There is thus need for a simple process of manufacturing alkali metal xanthates which produces a water-free product.

It has now been found that alkali metal xanthates free from water can be produced by a reaction between carbon disulphide and an aliphatic alcohol having two to six carbon atoms in the molecule, both in the vapour phase and in the presence of an inert gas, with solid alkali metal hydroxide. The reaction takes place at a temperature above the boiling point of the carbon disulphide but below the temperature of decomposition of the xanthate. In this temperature range the by-product water is volatile and so is carried away from the reaction zone by the gas stream. In this manner a solid xanthate product free from water can be produced.

It is therefore a primary object of this invention to prepare water-free alkali metal xanthates by direct reaction between carbon disulphide, alcohol and alkali metal hydroxide. Additional objects will appear hereinafter.

The process of this invention comprises the steps of
1. contacting an alkali metal hydroxide with a stoichiometric excess of carbon disulphide and of an aliphatic alcohol having two to six carbon atoms in the molecule, the carbon disulphide and alcohol being in the gas phase and in admixture with an inert gas, at a temperature in the range 50° C. to 120° C., thus bringing about a reaction between the alkali metal hydroxide, carbon disulphide and alcohol to form solid alkali metal xanthate and water vapour, and
2. separating the gaseous mixture of unreacted carbon disulphide, unreacted alcohol, by-product water vapour and inert gas from the solid alkali metal xanthate.

It is convenient to carry out the reaction in a moving bed reactor of inert particles such as glass spheres, the inert gas carrying the carbon disulphide and alcohol reactants being passed through the bed maintained at the desired temperature, while powdered alkali metal hydroxide is added continuously or stepwise to the bed. The unreacted carbon disulphide and unreacted alcohol together with the by-product water are carried in gaseous state from the reactor by the inert gas. It is of advantage to remove the water from the inert gas, add carbon disulphide and alcohol and recycle the gas through the reactor. The alkali metal xanthate remains in the reactor, or may be entrained in the gas stream and separated therefrom by means such as a cyclone. Since alkali metal xanthates are of lower density than corresponding alkali metal hydroxides it is possible to effect a separation of the xanthate product from the unreacted alkali metal hydroxide by entraining only the xanthate in the gas stream issuing from the reactor and then passing the gas stream through a cyclone where the xanthate is deposited.

The preferred alkali metal hydroxides suitable as reagents in the process of this invention are sodium hydroxide and potassium hydroxide.

Suitable aliphatic alcohol reagents include ethyl alcohol, n-propyl alcohol, isopropyl alcohol, n-butyl alcohol, isobutyl alcohol, sec-butyl alcohol, refined fusel oil which is mainly isoamyl alcohol, and amyl and hexyl alcohols. The reaction takes place most readily with primary alcohol, secondary and tertiary alcohols reacting more slowly.

An inert gas suitable for use in the process of this invention is nitrogen.

The novel process provides a means for producing water-free alkali metal xanthates.

The invention is illustrated by the following Examples but its scope is not limited to the embodiments shown therein.

EXAMPLE 1

Potassium Ethylxanthate (KEX)

Potassium hydroxide was admitted stepwise over 10 minutes to a vessel containing agitated glass beads at 110° C., through which flowed an equimolar mixture of the vapours of carbon disulphide and ethyl alcohol, (each — 6% v/v in nitrogen). Agitation was continued for 5 minutes after potassium hydroxide addition was completed. Analysis of the product showed that 42% of the potassium hydroxide had reacted to produce KEX in a yield of 81% based on potassium hydroxide.

EXAMPLE 2

Sodium Ethylxanthate (NaEX)

Sodium hydroxide was admitted stepwise over 10 minutes to a vessel containing agitated glass beads at 110° C., through which flowed an equimolar mixture of carbon disulphide and ethyl alcohol (6% v/v in nitrogen). Agitation was continued for 5 minutes after sodium hydroxide addition was completed. Product analysis showed that 14% of the sodium hydroxide had reacted for a 50% yield of NaEX based on sodium hydroxide.

EXAMPLE 3

Potassium Amylxanthate (KAX)

Potassium hydroxide was admitted stepwise over 10 minutes to a vessel containing agitated glass beads at 110° C., through which flowed a dilute equimolar gaseous mixture of carbon disulphide and amyl alcohol (refined fusel oil) (6% v/v in nitrogen). Agitation was continued for 5 minutes after potassium hydroxide addition was completed. 82% of the potassium hydroxide reacted to produce a yield of 65.9% KAX based on potassium hydroxide.

EXAMPLE 4

Sodium Amylxanthate (NaAX)

Sodium hydroxide was admitted stepwise over 10 minutes to a vessel containing agitated glass beads at 110° C., through which flowed a dilute equimolar gaseous mixture of carbon disulphide and amyl alcohol (refined fusel oil) (6% v/v in nitrogen). Agitation was continued for 5 minutes after sodium hydroxide addition was completed. In a sample of dust entrained by the gas and collected in a cyclone, sodium was distributed 50% as NaAX, 32% as by-products and 28% as unreacted alkali.

What we claim is:

1. A process for the manufacture of alkali metal xanthates comprising the steps of
   1. contacting an alkali metal hydroxide with a stoichiometric excess of carbon disulphide and of an aliphatic alcohol having two to six carbon atoms in the molecule, the carbon disulphide and alcohol being in the gas phase and in admixture with an inert gas, at a temperature in the range 50° C. to 120° C., thus bringing about a reaction between the alkali metal hydroxide, carbon disulphide and alcohol to form solid alkali metal xanthate and water vapour, and
   2. separating the gaseous mixture of unreacted carbon disulphide, unreacted alcohol, by-product water vapour and inert gas from the solid alkali metal xanthate.

2. A process as claimed in claim 1 wherein the reaction between the alkali metal hydroxide, carbon disulphide and alcohol is carried out in a moving bed of inert particles.

3. A process as claimed in claim 2 wherein the inert particles are glass spheres.

4. A process as claimed in claim 1 wherein the alkali metal hydroxide is sodium hydroxide or potassium hydroxide.

5. A process as claimed in claim 1 wherein the aliphatic alcohol is ethyl alcohol or amyl alcohol.

6. A process as claimed in claim 1 wherein the inert gas is nitrogen.

7. A process as claimed in claim 1 wherein in step (2) the alkali metal xanthate is entrained in the gaseous mixture of unreacted carbon disulphide, unreacted alcohol, by-product water vapour and inert gas and separated therefrom by a cyclone.

* * * * *